Feb. 23, 1926.                                                        1,574,578
C. E. HOLMES
SELF LOCKING SEAL NUT
Filed April 19, 1924
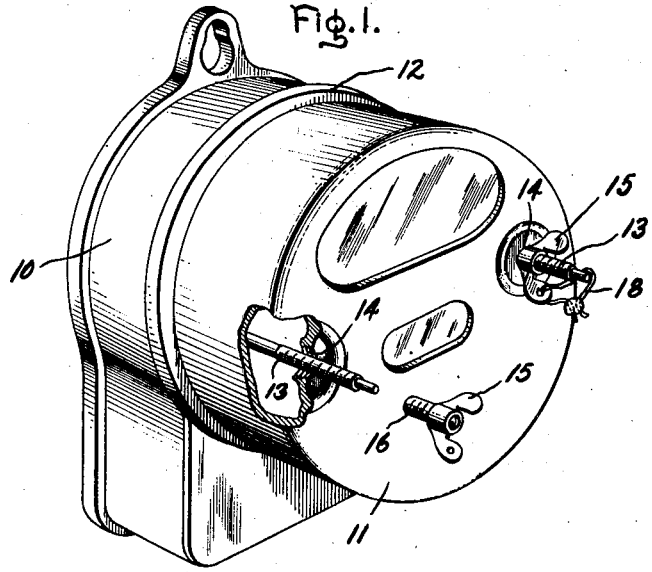
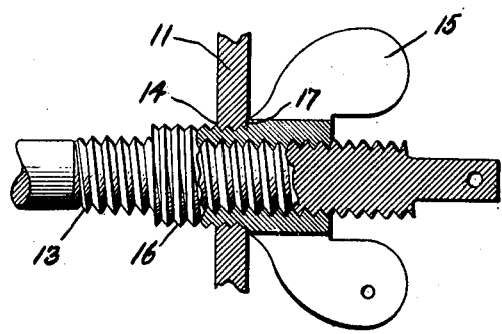
Inventor:
Charles E. Holmes,
by *Alexander F. [signature]*
His Attorney.

Patented Feb. 23, 1926.

1,574,578

UNITED STATES PATENT OFFICE.

CHARLES E. HOLMES, OF LYNN, MASSACHUSETTS, ASSIGNOR TO GENERAL ELECTRIC COMPANY, A CORPORATION OF NEW YORK.

SELF-LOCKING SEAL NUT.

Application filed April 19, 1924. Serial No. 707,740.

*To all whom it may concern:*

Be it known that I, CHARLES E. HOLMES, a citizen of the United States, residing at Lynn, in the county of Essex, State of Massachusetts, have invented certain new and useful Improvements in Self-Locking Seal Nuts, of which the following is a specification.

My invention relates to a self-locking seal nut for meters.

It is established practice to provide house type meters with a cover which is held in place by bolts extending through openings in the cover, the outer ends of the bolts being threaded and provided with wing nuts. To secure the cover in place, the wing nuts are screwed down against the cover and a wire is threaded through holes in the wing nuts and through the outer ends of the bolts and then sealed. The purpose of the seal is to prevent unauthorized persons from removing the cover and tampering with the meter and particularly to prevent unscrupulous persons from gaining access to the meter to slow it down or stop its operation so as to obtain the commodity being metered without paying for the same.

It has been found that the usual construction above referred to does not always prevent theft because of a slight unscrewing of the wing nut, or by a slight springing in of the cover away from the wing nut, a small wire may be worked under the wing nut and through the hole in the cover around the bolt and then moved against the rotating element of the meter, causing its stoppage. The seal is not broken and when the wire is removed, there is no evidence that the meter has been tampered with. It is the primary object of my invention to provide a construction which will prevent such mischief.

A further object is to provide a wing nut closure which is substantially moisture and dust-tight and which will not work loose.

In carrying my invention into effect, I provide a wing nut which is provided with a bushing which extends through the opening in the cover around the bolt. This bushing is threaded both externally and internally, the threads thereof cooperating with corresponding threads on the bolt and in the cover plate. In order that the cover will be pressed firmly against its seat as the wing nut is screwed into position, the outer set of threads have a slightly smaller pitch than the inner set of threads.

The features of my invention which I believe to be novel and patentable will be pointed out in the claims appended hereto. For a better understanding of my invention, reference is made in the following description to the accompanying drawing Fig. 1 of which shows a perspective view, partly in section, of the type of cover to which my invention is applicable and showing the application of my invention thereto; and Fig. 2 shows a detail view, partly in section, of my improved seal nut in sealing position.

In Fig. 1, I have represented the casing 10 of an ordinary house type electric meter with its cover 11. The inner edge of the cover is provided with an enlarged rim 12 which fits over a seat on the casing proper. Bolts 13 extend from the framework of the casing through the front cover which is provided with openings 14 for this purpose. The bolts are threaded and are provided with wing nuts 15 which, when screwed up against the cover, secure the same in place and clamp the cover tightly against its seat.

As heretofore constructed, the holes in the cover have not been threaded and were made slightly larger than the bolts and an ordinary wing nut was used to secure the cover in place. Such a construction permitted the cover, which is made of thin metal, to be sprung in by exerting pressure on the cover adjacent the bolts, so that a fine wire could be worked in under the wing nut and through the opening in the cover around the bolts and then twisted around until it came in contact with the meter disk which, in the usual construction, extends forward into the central part the cover chamber. To prevent this, I slightly enlarge the opening 14 in the cover and thread the same as illustrated. Then, I provide the wing nut with an integral bushing 16 externally threaded to fit the threads in the cover and internally threaded to fit the threads on the bolt 13. The threads on the exterior of the bushing are pitched in the same direction as the threads on the bolt, but the first mentioned set of threads are preferably made to have a slightly smaller pitch than the threads on the bolt, so that in screwing the wing nut into place, the cover will travel in towards its seat slightly and at a slower rate than the wing nut. When the shoulder 17 of the wing nut comes against its seat on the cover, the cover will have been snugly pressed against its seat on the casing 10. The proportions of the parts illustrated in Fig. 2 have been found satisfactory.

It will be seen that this construction securely locks the cover to the bolts so that it cannot be pressed in. The closure around the bolts is substantially dust and moisture tight, much more so than with the usual construction, and the arrangement is such that when the wing nut shoulder 17 comes against the surface of the cover a locking effect takes place which tends to prevent distortion of the cover and glass breakage by undue presure. The wing nut cannot be worked loose by vibrations or become loose due to the flow of the metal in the cover.

It will be seen that a wire could not be inserted through such a closure except by unscrewing the nut a considerable distance (more than sufficient to break the seal wire shown at 18) and leaving positive evidence that the meter had been tampered with.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other arangements.

What I claim as new and desire to secure by Letters Patent of the United States, is:—

1. A casing, a cover therefor provided with an opening, a threaded bolt extending from said casing through the opening in said cover, and a seal nut on said bolt for holding said cover in place, said nut being provided with an integral bushing threaded on said bolt and in said opening and having a shoulder abutting against said cover.

2. A casing, a cover therefor provided with a threaded bolt hole, a threaded bolt of smaller diameter than said hole extending from said casing through said bolt hole, and a seal nut on said bolt having an externally threaded bushing threaded into said hole, the threads on said bushing having a slightly less pitch than the threads on said bolt.

3. A meter casing, a cover therefor provided with a threaded bolt hole, a threaded bolt of smaller diameter than said hole extending from said casing through the hole in said cover, a wing nut threaded on said bolt for holding said cover in place, an integral bushing on said nut threaded into the hole in said cover, the pitch of the threads on the bushing being in the same direction as the pitch of the threads on said bolt, but having a smaller angle of pitch, and means for sealing said nut in place.

In witness whereof, I have hereunto set my hand this 17th day of April, 1924.

CHARLES E. HOLMES.